(12) United States Patent
Lee

(10) Patent No.: US 12,031,596 B2
(45) Date of Patent: Jul. 9, 2024

(54) DIRECT-ACTING SELF-ENERGIZING BRAKE CALIPER

(71) Applicant: Kwangjin Michael Lee, Novi, MI (US)

(72) Inventor: Kwangjin Michael Lee, Novi, MI (US)

(*) Notice: Subject to any disclaimer, the term of this patent is extended or adjusted under 35 U.S.C. 154(b) by 398 days.

(21) Appl. No.: 17/485,219

(22) Filed: Sep. 24, 2021

(65) Prior Publication Data
US 2022/0235832 A1  Jul. 28, 2022

(30) Foreign Application Priority Data

Jan. 22, 2021 (KR) .................. 10-2021-0009233
May 27, 2021 (KR) .................. 10-2021-0068018

(51) Int. Cl.
| | |
|---|---|
| F16D 65/18 | (2006.01) |
| F16D 55/226 | (2006.01) |
| F16D 65/00 | (2006.01) |
| F16D 125/64 | (2012.01) |
| F16D 121/04 | (2012.01) |
| F16D 125/58 | (2012.01) |
| F16D 125/60 | (2012.01) |
| F16D 55/00 | (2006.01) |

(52) U.S. Cl.
CPC ....... *F16D 55/226* (2013.01); *F16D 65/0068* (2013.01); *F16D 65/18* (2013.01); *F16D 2055/0016* (2013.01); *F16D 2121/04* (2013.01); *F16D 2125/582* (2013.01); *F16D 2125/60* (2013.01); *F16D 2125/64* (2013.01)

(58) Field of Classification Search
CPC .... F16D 55/226; F16D 65/0068; F16D 65/18; F16D 2055/0016; F16D 2121/04; F16D 2125/582; F16D 2125/60; F16D 2125/64

USPC .................................. 188/24.11–24.22, 59
See application file for complete search history.

(56) References Cited

U.S. PATENT DOCUMENTS

| | | | |
|---|---|---|---|
| 2,348,078 A | 5/1944 | Ledwinka |
| 2,713,400 A | 7/1955 | Coskun |
| 3,003,589 A | 10/1961 | Desbrow |
| 3,109,517 A | 11/1963 | Butler et al. |
| 3,129,789 A | 4/1964 | Hodkinson |

(Continued)

FOREIGN PATENT DOCUMENTS

| | | |
|---|---|---|
| DE | 11 52 321 B | 8/1963 |
| DE | 1 775 941 B1 | 3/1972 |

(Continued)

*Primary Examiner* — Christopher P Schwartz
(74) *Attorney, Agent, or Firm* — United One Law Group LLC; Sik Kim; Jhongwoo Peck

(57) ABSTRACT

A self-energizing brake caliper includes a caliper bracket fixed to a body of a braked device; a first caliper arm; and a second caliper arm. The first caliper arm comprises a first end which is rotatably connected to the caliper bracket with respect to a first rotation axis extending in the radial direction of a wheel and a second end which is rotatably connected to the inboard brake pad at a first position with respect to a second rotation axis which is parallel with the first rotation axis. The second caliper arm comprises a first end which is rotatably connected to the caliper bracket with respect to a third rotation axis extending in the radial direction of the wheel and a second end which is rotatably connected to the outboard brake pad at a second position with respect to a fourth rotation axis which is parallel with the third rotation axis.

15 Claims, 16 Drawing Sheets

(56) References Cited

U.S. PATENT DOCUMENTS

| | | | | |
|---|---|---|---|---|
| 3,137,368 | A | * | 6/1964 | Press ............... F16D 65/54 |
| | | | | 188/72.9 |
| 3,189,128 | A | | 6/1965 | Herbert |
| 3,338,337 | A | * | 8/1967 | Freeland ............ B62L 3/023 |
| | | | | 188/344 |
| 3,465,849 | A | | 9/1969 | Bernfeld et al. |
| 3,489,022 | A | | 1/1970 | Krahl |
| 3,749,206 | A | | 7/1973 | Dence |
| 3,899,057 | A | * | 8/1975 | Carre ............... B60T 11/16 |
| | | | | 188/344 |
| 4,019,608 | A | | 4/1977 | Johnson |
| 4,060,153 | A | | 11/1977 | Kobelt |
| 4,108,285 | A | | 8/1978 | Kobelt |
| 4,155,431 | A | | 5/1979 | Johnson |
| 4,193,479 | A | * | 3/1980 | Quilici ............... B62L 3/08 |
| | | | | 188/26 |
| 4,270,631 | A | | 6/1981 | Kobelt |
| 4,391,352 | A | * | 7/1983 | Brown ............... B62L 1/16 |
| | | | | 188/24.12 |
| 4,393,962 | A | * | 7/1983 | Kobelt ............... B61H 5/00 |
| | | | | 188/59 |
| 5,012,901 | A | | 5/1991 | Campbell et al. |
| 5,547,047 | A | * | 8/1996 | Kohar ............... F16D 55/2245 |
| | | | | 188/205 A |
| 6,135,243 | A | | 10/2000 | Kraihanzel |
| 6,318,513 | B1 | | 11/2001 | Dietrich et al. |
| 9,415,830 | B1 | * | 8/2016 | Hirotomi ............ B62L 1/16 |
| 9,932,051 | B2 | * | 4/2018 | Suzuki ............... F16D 55/2245 |
| 10,926,744 | B2 | * | 2/2021 | Lee ................... F16D 55/46 |
| 11,028,889 | B2 | | 6/2021 | Lee |
| 2005/0139435 | A1 | * | 6/2005 | Jelley ............... F16D 53/00 |
| | | | | 188/72.2 |
| 2008/0230330 | A1 | | 9/2008 | Herr |
| 2009/0065311 | A1 | | 3/2009 | Kim |
| 2012/0024639 | A1 | | 2/2012 | Castro |

FOREIGN PATENT DOCUMENTS

| | | |
|---|---|---|
| DE | 10 2010 023 700 A1 | 12/2011 |
| JP | 2018-528363 A | 9/2018 |
| KR | 2000-0046028 A | 7/2000 |
| KR | 10-0837974 B1 | 6/2008 |
| KR | 10-2012-0074474 A | 7/2012 |
| KR | 10-1262832 B1 | 5/2013 |
| KR | 10-1509976 B1 | 4/2015 |
| KR | 10-2016-0122247 A | 10/2016 |
| KR | 10-2017-0026797 A | 3/2017 |
| KR | 10-2017-0104771 A | 9/2017 |
| KR | 10-2018-0048814 A | 5/2018 |
| KR | 10-1977322 B1 | 5/2019 |
| KR | 10-2043696 B1 | 11/2019 |

* cited by examiner

DIRECT-ACTING SELF-ENERGIZING BRAKE CALIPER

CROSS-REFERENCE TO RELATED APPLICATIONS

The present application claims priorities to Korean Patent Application No. 10-2021-0009233 filed on Jan. 22, 2021 and Korean Patent Application No. 10-2021-0068018 filed on May 27, 2021. The aforementioned applications are herein incorporated by reference in their entireties.

TECHNICAL FIELD

The present disclosure relates to a self-energizing brake caliper which amplifies the braking force generated by an actuator such as a hydraulic cylinder or an electronic motor but prevents self-locking due to wedge structure from being generated.

BACKGROUND

In a hydraulic brake system, a driver presses a brake pedal so that the pressure generated by a master cylinder is transferred to braking force by disc brake caliper or drum brake wheel cylinder. A self-energizing brake for amplifying the braking force has been known. For example, the self-energizing brake using a ball and ramp is disclosed by U.S. Pat. No. 5,012,901 and the self-energizing brake using wedge-effect is disclosed by U.S. Pat. No. 6,318,513, US Patent Application Publication Nos. 2008/0230330A1 and 2009/0065311A1.

The self-energizing brake according to the prior arts has complex structure, low productivity and high manufacturing costs. In particular, many reasons including self-locking effects in the wedge structure makes the self-energizing brake inapplicable.

Brake-by-wire system uses an EMB (electro-mechanical brake) caliper driven by an electric motor. When the EMB caliper is applied in a front-wheel disc brake, the braking force generated by the motor may not be sufficient for an emergency braking.

The inventor suggested a self-energizing brake caliper for resolving the problems of the prior arts, which is patented as Korean Patent No. 10-2043696 and U.S. Pat. No. 10,926,744.

The present disclosure relates to a direct-acting self-energizing brake caliper which can be used in a braking device where the actuating force is directly applied to the brake pads.

SUMMARY

Accordingly, the present disclosure has been made in view of the above-mentioned problems occurring in the prior art, and it is an object of the present disclosure to provide a self-energizing brake caliper without the wedge mechanism while the braking force generated by a hydraulic cylinder or a motor is greatly amplified, thereby serving excellent braking force.

To accomplish the above-mentioned object, according to the present disclosure, there is provided a self-energizing brake caliper of a braking device having a first braking part applying a braking force to an inboard brake pad and a second braking part applying a braking force to an outboard brake pad. The brake caliper comprises a caliper bracket fixed to a body of a braked device; a first caliper arm; and a second caliper arm. The first caliper arm comprises a first end which is rotatably connected to the caliper bracket with respect to a first rotation axis extending in the radial direction of a wheel and a second end which is rotatably connected to the inboard brake pad at a first position with respect to a second rotation axis which is parallel with the first rotation axis. The second caliper arm comprises a first end which is rotatably connected to the caliper bracket with respect to a third rotation axis extending in the radial direction of the wheel and a second end which is rotatably connected to the outboard brake pad at a second position with respect to a fourth rotation axis which is parallel with the third rotation axis.

The first caliper arm can be separate from the first braking part and the second caliper arm can be separate from the second braking part.

At least one of the first caliper arm and the second caliper arm can be connected to the caliper bracket by a return spring.

At least one of the first caliper arm and the second caliper arm can be provided in plurality.

A plurality of the first caliper arms are parallel with one another and a plurality of the second caliper arms are parallel with one another.

At least a portion of the first caliper arm and a portion of the second caliper arm can be disposed in a space provided in the caliper bracket.

One of the first braking part and the second braking part can comprise a piston which applies a braking force to one of the inboard brake pad and the outboard brake pad; and the other of the braking parts can comprise a caliper finger which slides along a sliding pin according to the piston operation to apply a braking force to the other brake pad. The piston can provide a space which allows the first caliper arm to rotate. The piston can be provided in plurality One of the first braking part and the second braking part can comprise a first piston which applies a braking force to the inboard brake pad and the other of the braking parts can comprise a second piston which applies a braking force to the outboard brake pad. The first piston can provide a space which allows the first caliper arm to rotate, and the second piston can provide a space which allows the second caliper arm to rotate.

At least one of the first piston and the second piston can be provided in plurality.

The first braking part and the second braking part can apply the braking force to the brake pads by a cable connected thereto.

The present disclosure provides a self-energizing brake caliper which can be used in a variety of the braking devices where the braking force of an actuator is directly applied to brake pads.

BRIEF DESCRIPTION OF DRAWINGS

The present disclosure will be more fully understood from the following detailed description taken in conjunction with the accompanying drawings.

Figure 1:
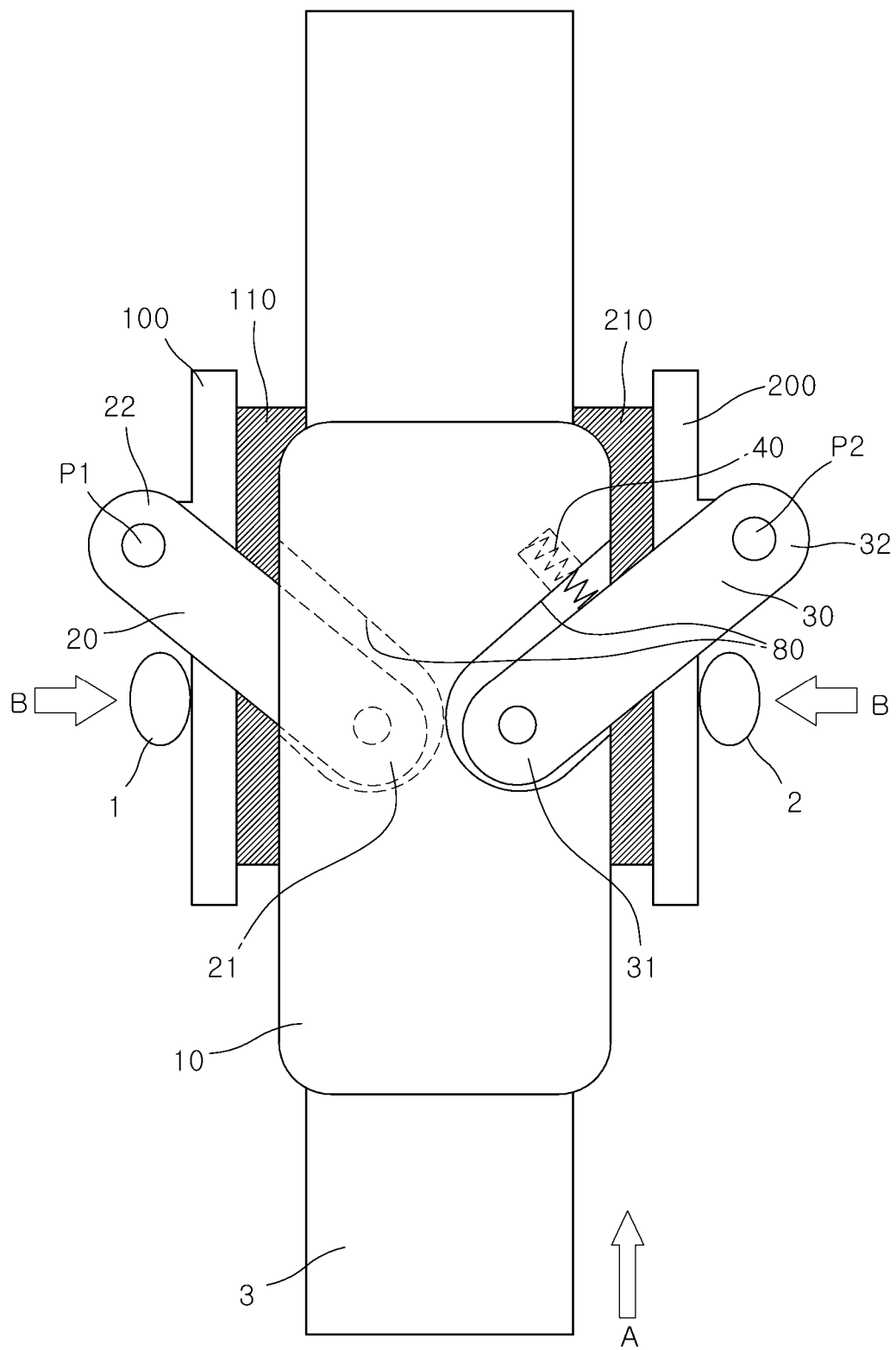
FIG. 1 is a conceptual drawing for showing the kinematic relationship and behavior of the self-energizing brake caliper which is used in a direct-pull braking device.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION

Hereinafter, the present disclosure will be described in detail with reference to the accompanying drawings. As those skilled in the art would realize, the described embodiments may be modified in various different ways, all without departing from the spirit or scope of the present disclosure.

In this specification, the essential elements for the present disclosure will be described and the non-essential elements may not be described. However, the scope of the present disclosure should not be limited to the invention including only the described components. Further, it should be understood that the invention which includes additional element or does not have non-essential elements can be within the scope of the present disclosure.

The terms "first," "second," or the like are herein used to distinguishably refer to same or similar elements, or the steps of the present disclosure and they may not infer an order or a plurality.

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

The term "or" in this specification is defined to indicate at least one of a plurality of elements, not to indicate any one of a plurality of the elements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

The term "coupled" or "connected" denotes a physical relationship between two components whereby the components are either directly connected to one another or indirectly connected via one or more intermediary components.

A wheel (3) in this specification denotes a rotating body to be braked. For a rim brake of a bicycle, the wheel means a wheel including a rim. For a caliper brake of a vehicle, the wheel means a brake disc.

In the present specification, the term "inboard" means the vehicle side of the brake disc, and the term "outboard" means the opposite side of the inboard side with respect to brake disc. However, the inboard and the outboard can be arbitrarily defined for a two-wheeled vehicle such as a bicycle. For example, if the left side of the rider is defined as the inboard, the right side of the rider becomes the outboard, vice versa.

The direction "A" in the drawings denotes the direction where a wheel (3) advances against a brake pad when the brake pad contacts with the wheel (3). The direction "B" in the drawings means the direction of the braking force applied to the brake pads (100, 200).

The radial direction in this specification denotes not only the direction which extends to the rim of a wheel from the center of the wheel but also the parallel direction thereto. The radial direction also means the direction which extends from the inner side of the wheel and crosses the rim of the wheel.

Figure 2:
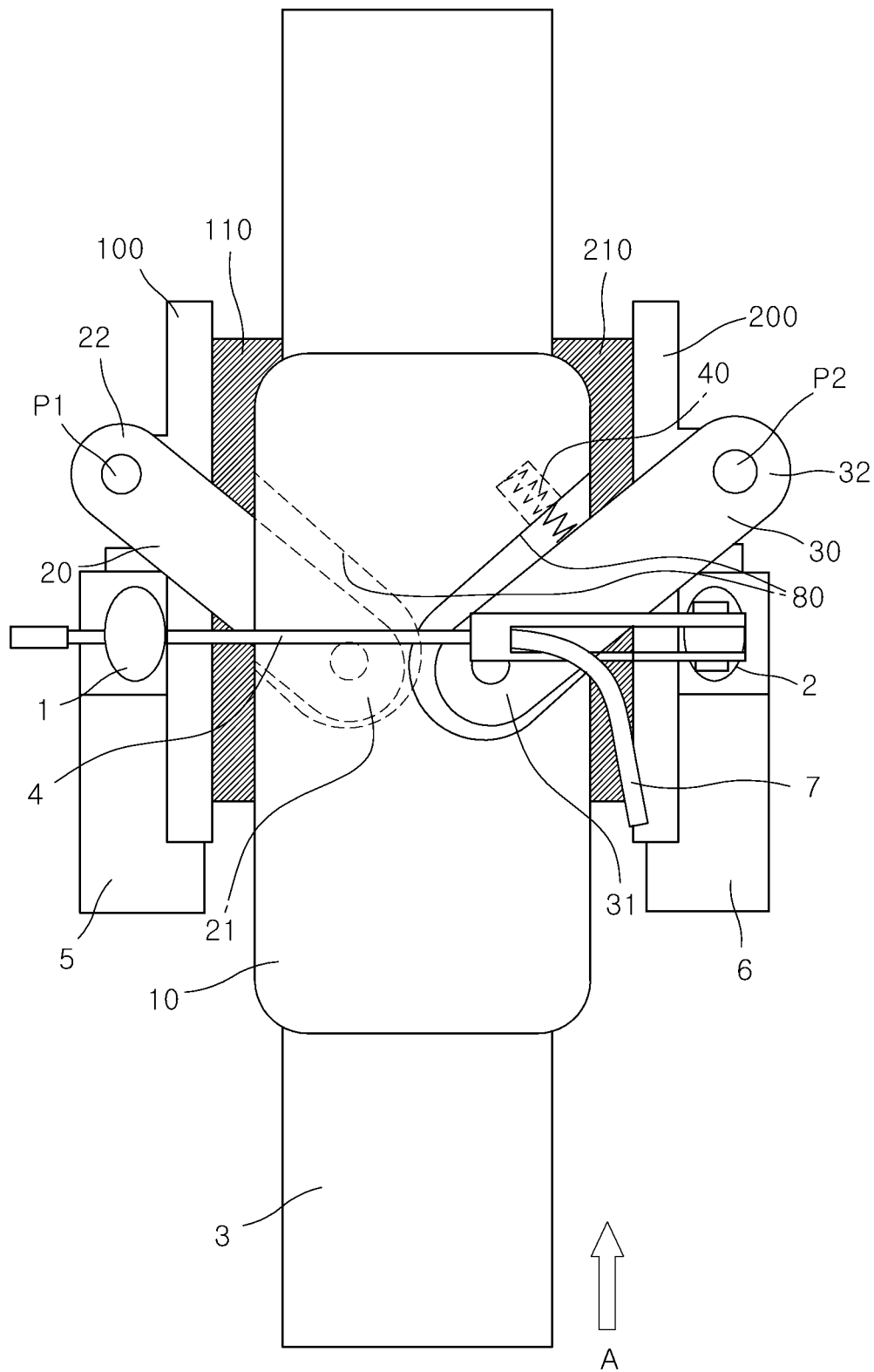
FIG. 2 is a conceptual drawing where some components are added in FIG. 1.

FIG. 1. is a conceptual drawing of the self-energizing brake caliper of the present disclosure which is used in a direct-pull braking device. FIG. 2 is a conceptual drawing of the brake caliper where some components of the direct-pull braking device are added in FIG. 1.

The direct-pull braking device is a kind of the braking device used for a bicycle. According to the braking device, a cable (4) rotates a first rotating vertical arm (1) and a second rotating vertical arm (2) toward a wheel rim (3) by a noodle (7) when the brake is operated. The supports of the first rotating vertical arm (1) and the second rotating vertical arm (2) are fixed at a frame and include the rotation axes of the vertical arms, respectively. Other components of the direct-pull braking device which have insignificant relationship with the present disclosure will not be described in detail.

The self-energizing brake caliper of the present disclosure which is used in the direct-pull braking device comprises a caliper bracket (10), a first caliper arm (20), and a second caliper arm (30). The caliper bracket (10) can be fixed at a braked body or a wheel fork of a wheel.

The inboard brake pad (100) comprises a first friction member (110) which contacts with the inboard side of the wheel rim (3) and applies a braking force thereto. The outboard brake pad (200) comprises a second friction member (210) which contacts with the outboard side of the wheel rim (3) and applies a braking force thereto. It should be understood that the inboard brake pad (100) and the outboard brake pad (200) of the other embodiments of the present disclosure have substantially the same configuration to the brake pads described in the above.

The first caliper arm (20) is rotatably connected to the caliper bracket (10) at a first end (21) and is rotatably connected to the inboard brake pad (100) at a second end (22). The first end (21) is rotatably connected to the caliper bracket (10) with respect to a first rotation axis which extends in the radial direction of the wheel. The second end (22) is connected to the inboard brake pad (100) at a first position (P1) to rotate with respect to a second rotation axis which is parallel with the first rotation axis. At least a portion of the first caliper arm (20) can be disposed in a space (80) provided in the caliper bracket (10). The space (80) can be a recess.

The second caliper arm (30) is rotatably connected to the caliper bracket (10) at a first end (31) and is rotatably connected to the outboard brake pad (200) at a second end (32). The first end (31) is rotatably connected to the caliper bracket (10) with respect to a third rotation axis which extends in a radial direction of the wheel. The third rotation axis can be the same axis to the first rotation axis or the axis which is spaced apart from the first rotation axis. The second end (32) is connected to the outboard bake pad (200) at a second position (P2) to rotate with respect to a fourth rotation axis which is parallel with the third rotation axis. At least a portion of the second caliper arm (30) can be disposed in the space (80) provided in the caliper bracket (10).

It should be understood that at least a portion of the first caliper arm and the second caliper arm can be disposed in the space (80) provided in the caliper bracket (10) in the other embodiments of the present disclosure unless described otherwise.

The first caliper arm (20) or the second caliper arm (30) can be connected to the caliper bracket (10) by a return spring (40).

In the other embodiments of the present disclosure, the first caliper arm or the second caliper arm can be connected to the caliper bracket (10) by return spring unless described otherwise.

In the other embodiments of the present disclosure, the first rotation axis and the third rotation axis extend in the radial direction of the wheel unless described otherwise.

When a brake is operated, the noodle (7) operates so that the first rotating vertical arm (1) and the second rotating vertical arm (2) press the inboard brake pad (100) and the outboard brake pad (200) toward the wheel rim (3), respectively. When the inboard brake pad (100) is pressed toward the wheel rim (3), the first caliper arm (20) rotates in the clockwise direction in FIG. 1 to apply additional braking force to the inboard brake pad (100), thereby providing the self-energizing effects. When the outboard brake pad (200) is pressed toward the wheel rim (3), the second caliper arm (30) rotates in the counterclockwise direction to apply additional braking force to the outboard brake pad (200), thereby providing the self-energizing effects.

Figure 3:
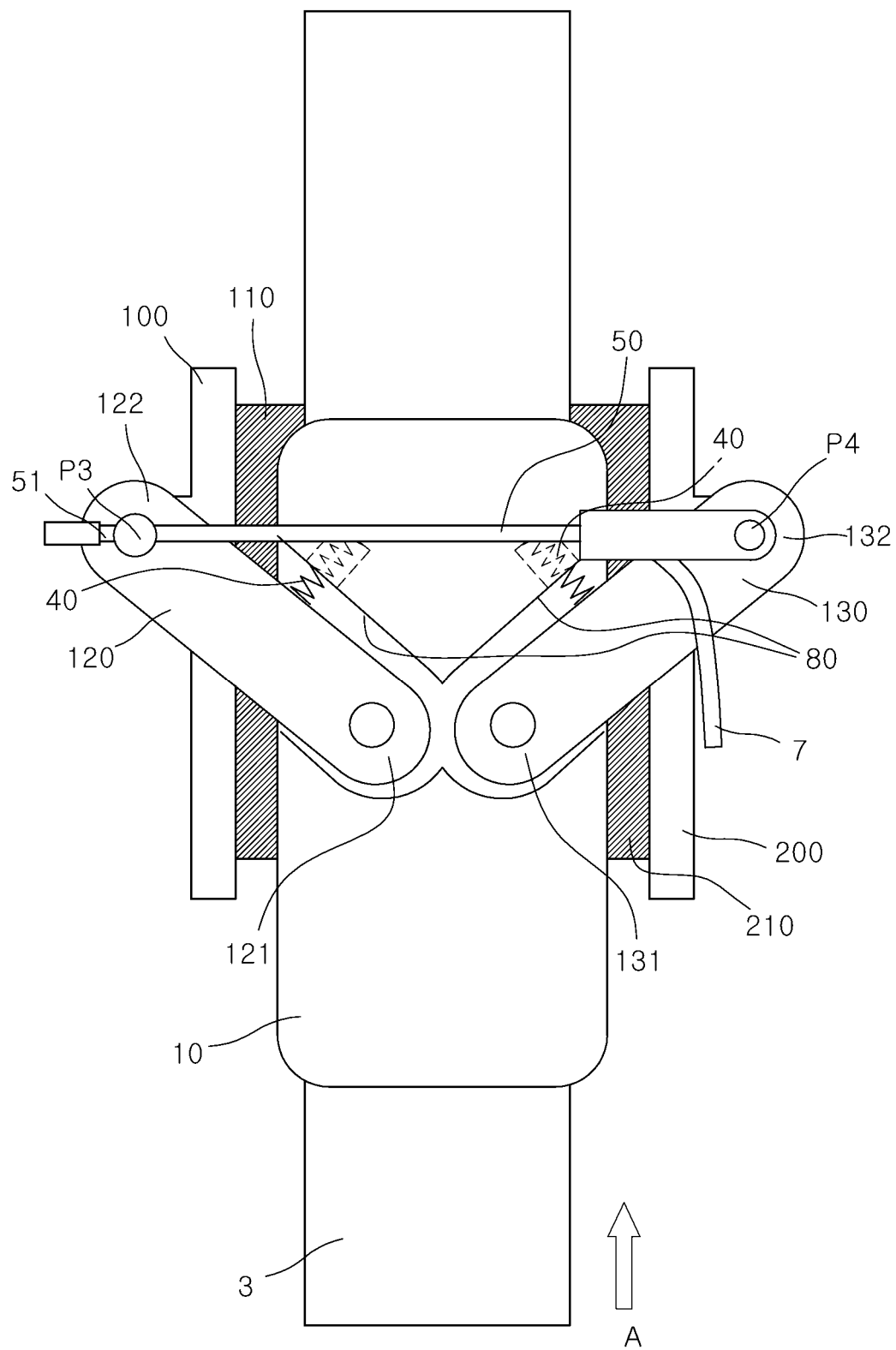
FIG. 3 is a conceptual drawing for showing the kinematic relationship and behavior of the self-energizing brake caliper which is used in a direct-pull braking device of cable type.

FIG. 3 is the embodiments where the self-energizing brake caliper of the present disclosure is applied to a direct-pull braking device of cable type. According to the direct-pull braking device of cable type, when a brake is operated, a cable (50) which is connected to the inboard brake pad (100) and the outboard brake pad (200) is pulled to generate a braking force. The direct-pull braking device of cable type is well known and thus the other components of the device which has insignificant relationship with the present disclosure will not be described in detail.

The self-energizing brake caliper of the embodiments comprises a caliper bracket (10), a first caliper arm (120) and a second caliper arm (130). The first caliper arm (120) and the second caliper arm (130) can be connected to the caliper bracket (10) by a return spring (40). The caliper bracket (10) can be fixed at the braked body or a wheel fork.

The first caliper arm (120) has a first end (121) which is rotatably connected to the caliper bracket (10) with respect to a first rotation axis extending in the radial direction of a wheel, and a second end (122) which at a third position (P3) is rotatably connected to the inboard brake pad (100) with respect to a second rotation axis that is parallel with the first rotation axis. The cable (50) can be connected to the inboard brake pad (100) at the third position (P3). Alternatively, the third position (P3) may not be the connecting position of the cable.

The second caliper arm (130) has a first end (131) which is rotatably connected to the caliper bracket (10) with respect to a third rotation axis extending in the radial direction of a wheel, and a second end (132) which at a fourth position (P4) is rotatably connected to the outboard brake pad (200) with respect to a fourth rotation axis that is parallel with the third rotation axis. The cable (50) can be connected to the outboard brake pad (200) at the fourth position (P4). Alternatively, the fourth position (P4) may not be the connecting position of the cable.

When the brake is operated, the inboard brake pad (100) and the outboard brake pad (200) are pressed toward the wheel rim (3) by the cable (50) to brake the wheel. When the inboard brake pad (100) is pressed toward the wheel rim (3), the first caliper arm (120) rotates in the clockwise direction in FIG. 3 to apply additional braking force to the inboard brake pad (100), thereby providing the self-energizing effects. When the outboard brake pad (200) is pressed toward the wheel rim (3), the second caliper arm (130) rotates in the counterclockwise direction in FIG. 3 to apply additional braking force to the outboard brake pad (200), thereby providing the self-energizing effects.

Figure 4:
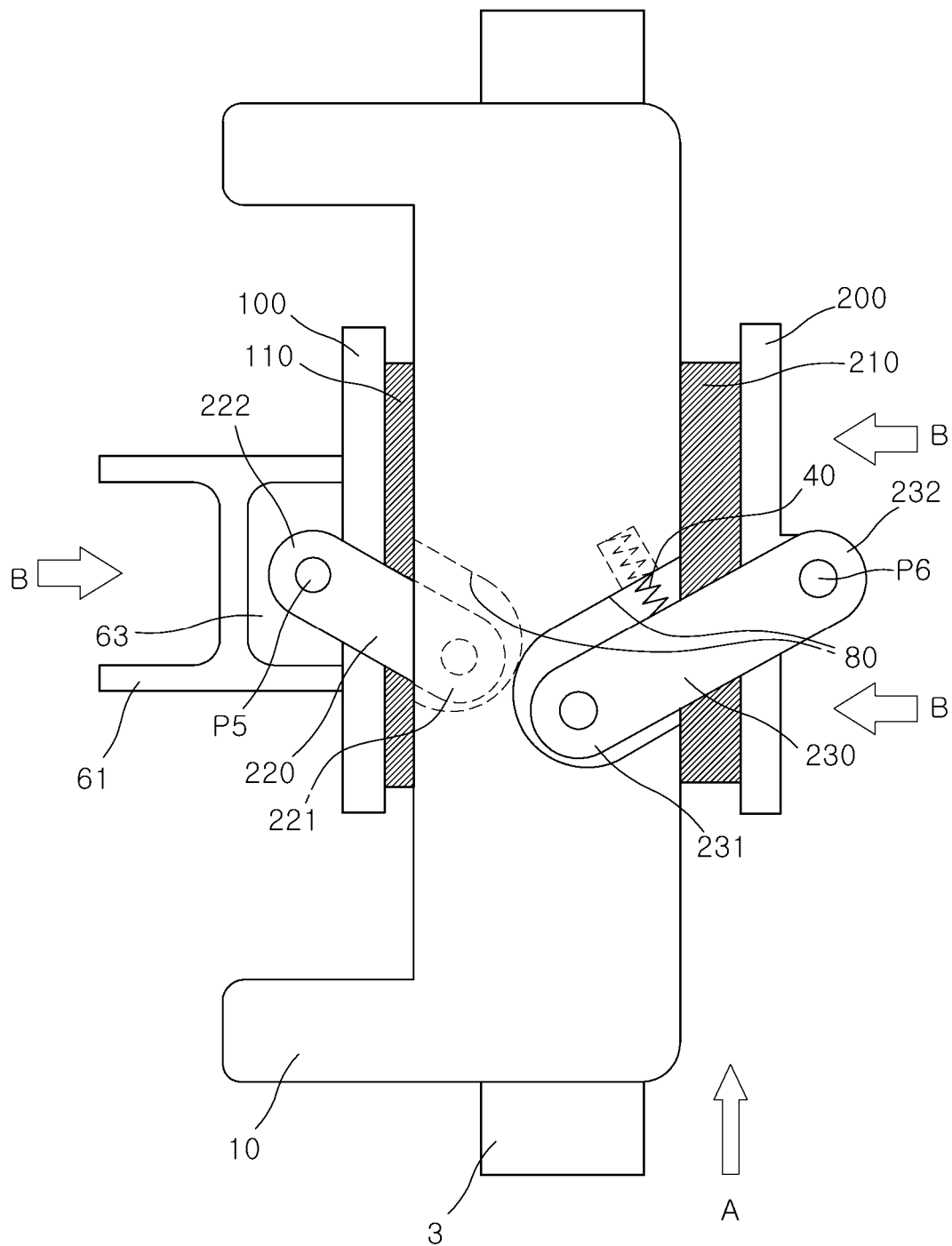
FIG. 4 is a conceptual drawing for showing the kinematic relationship and behavior of the self-energizing brake caliper which is used in a braking device of floating caliper type.
Figure 5:
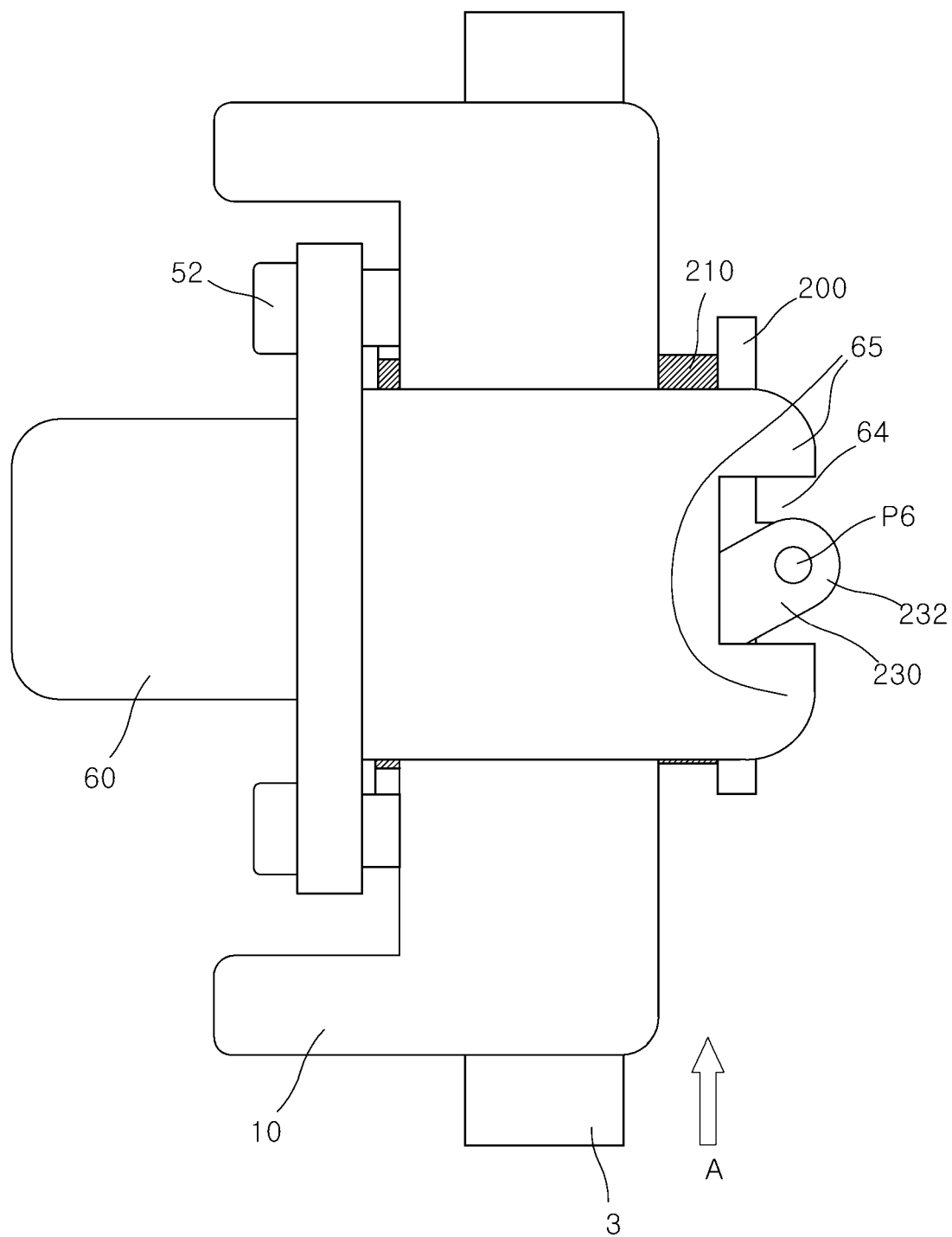
FIG. 5 is a conceptual drawing where some components are added in FIG. 4.

FIGS. 4 and 5 are the conceptual drawings of a self-energizing brake caliper of the present disclosure which is applied to a floating caliper type brake.

The floating caliper type brake comprises a piston (61) which applies a braking force to one of the inboard brake pad (100) and the outboard brake pad (200), and a floating caliper housing which includes a caliper finger (65) which slides along a slide pin (52) by the reaction force due to the operation of the piston (61) to apply a braking force to the other of the inboard brake pad (100) and the outboard brake pad (200). Although it is illustrated in FIGS. 4 and 5 that the piston (61) applies the braking force to the inboard brake pad (100), it should be understood that the piston (61) can be provided to apply the braking force to the outboard brake pad (200) and the caliper finger (65) can be provided at the inboard brake pad (100). A plurality of the pistons (61) can be provided. The other components which have insignificant relationship with the present disclosure will not be described.

The self-energizing brake caliper of the present disclosure shown in FIGS. 4 and 5 comprises a caliper bracket (10), a first caliper arm (220) and a second caliper arm (230).

The caliper bracket (10) can be fixed to a braked body.

The first caliper arm (220) has a first end (221) which is rotatably connected to the caliper bracket (10) with respect to a first rotation axis extending in the radial direction of a wheel, and a second end (222) which at a fifth position (P5) is rotatably connected to the brake pad where the braking force is applied by the piston (61). The second end (222) is rotatable with respect to a second rotation axis which is parallel with the first rotation axis.

A space (63) which allows the first caliper arm (220) to rotate at the fifth position (P5) can be provided in the piston (61).

The second caliper arm (230) has a first end (231) which is rotatably connected to the caliper bracket (10) with respect to a third rotation axis extending in the radial direction of a wheel, and a second end (232) which at a sixth position (P6) is rotatably connected to the brake pad where the first caliper arm (22) is not connected. The second end (232) can rotate with respect to a fourth rotation axis which is parallel with the third rotation axis.

A space (64) which allows the second caliper arm (230) to rotate at the sixth position (P6) can be provided in the caliper finger (65).

The inboard brake pad (100) is pressed toward the wheel rim (3) in "B" direction by the piston (61). The outboard brake pad (200) is also pressed toward the wheel rim (3) by the reaction force of the caliper finger (65), which is generated by the piston (61), thereby providing a braking force.

The first caliper arm (220) rotates in the clockwise direction in FIG. 4 and the second caliper arm (230) rotates in the counterclockwise direction in FIG. 4 when the inboard brake pad (100) and the outboard brake pad (200) are pressed toward the wheel rim (3), thereby providing self-energizing effects to amplify the braking force.

Figure 6:
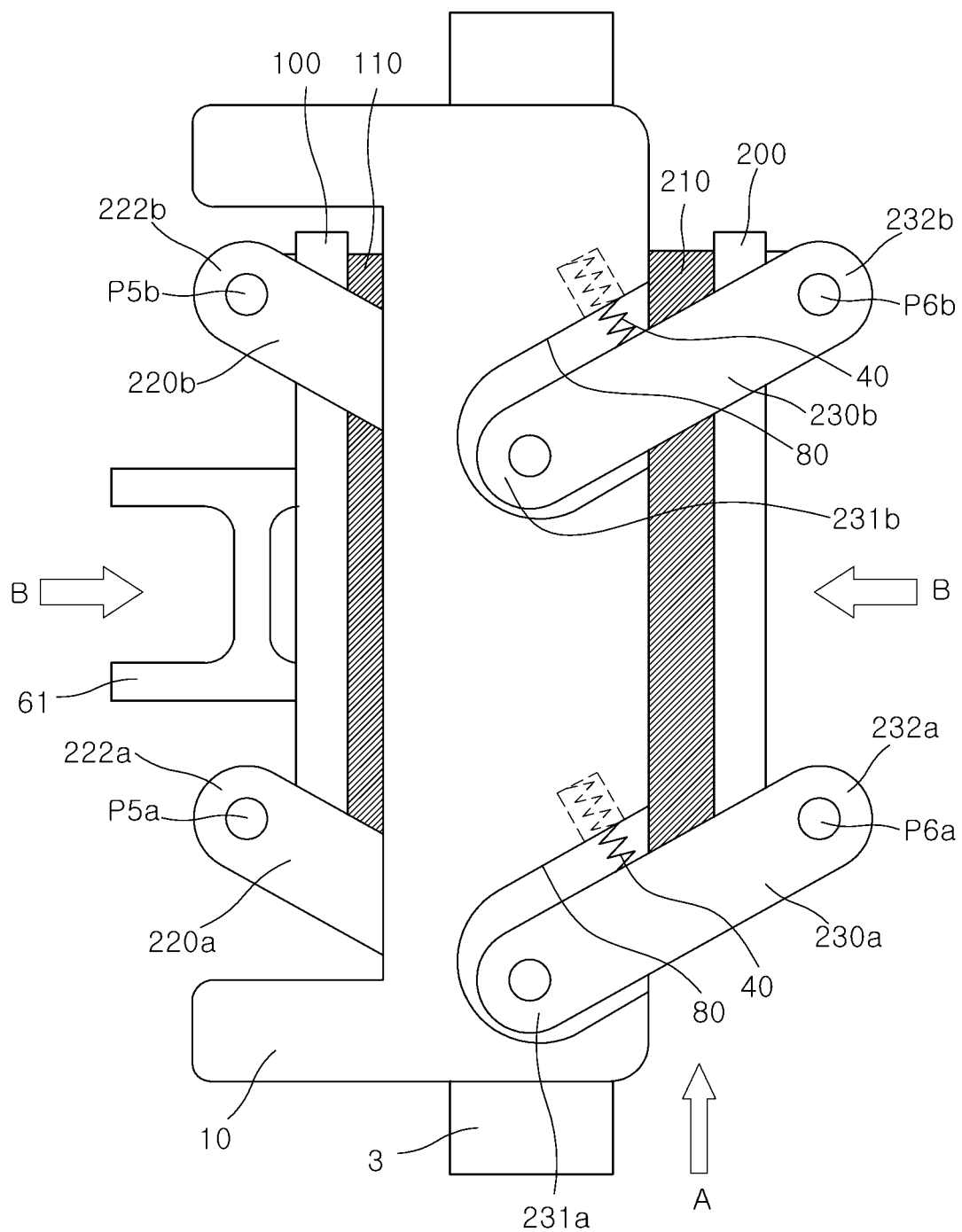
FIG. 6 is a conceptual drawing for showing the kinematic relationship and behavior of the self-energizing brake caliper which is used in a braking device of floating caliper type according to another embodiment of the present disclosure.
Figure 7:
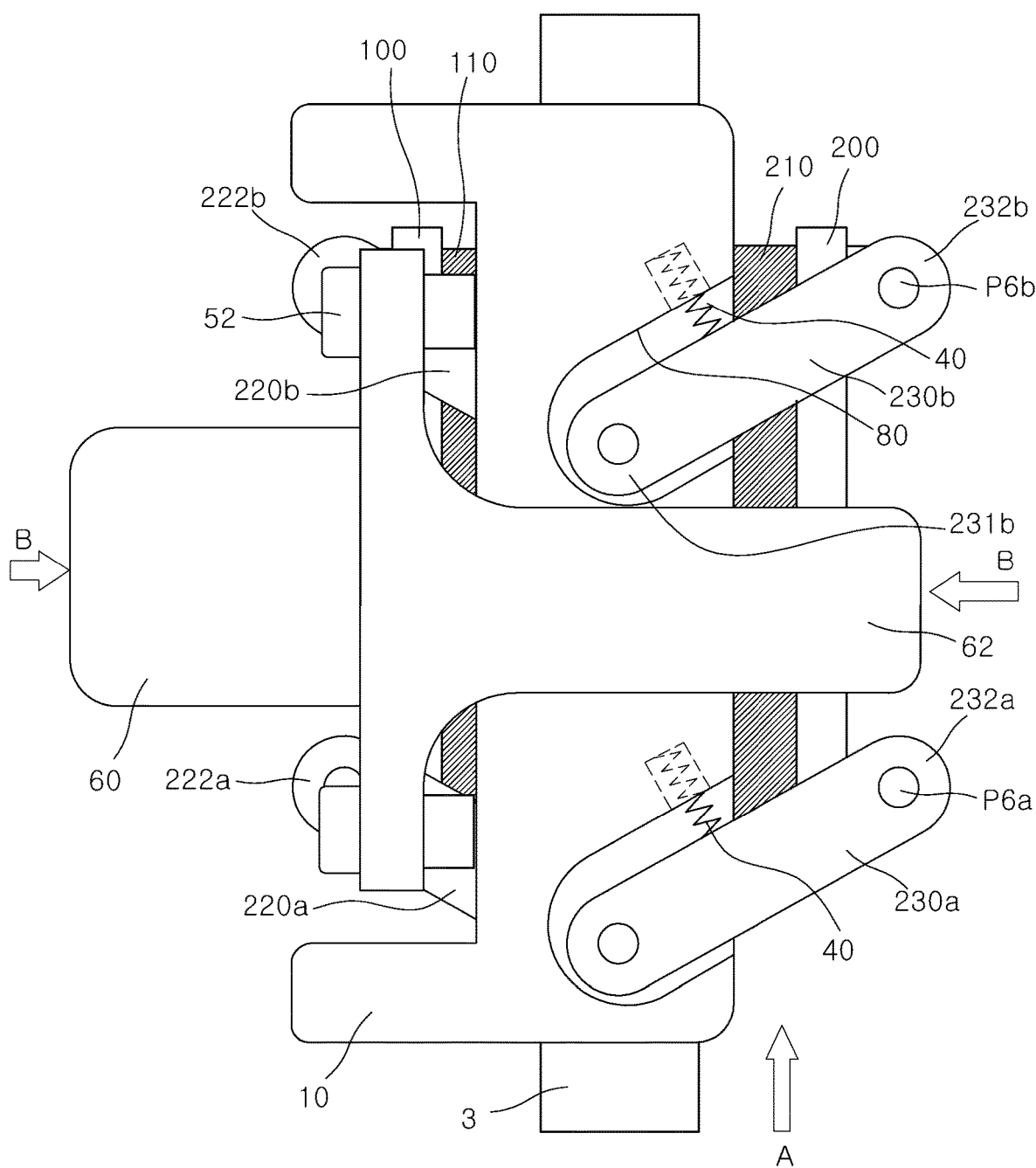
FIG. 7 is a conceptual drawing where some components are added in FIG. 6.

In FIGS. 6 and 7, other embodiments of the present disclosure which can be applied to a braking device of floating caliper type are illustrated.

The embodiments of FIGS. 6 and 7 are different from the embodiments of FIGS. 4 and 5 in that two first caliper arms (220a, 220b) and two second caliper arms (230a, 230b) are provided.

The first caliper arms (220a, 220b) are parallel with each other. Each first caliper arm (220a, 220b) includes a first end (not illustrated) which is rotatably connected to the caliper bracket (10) with respect to a first rotation axis; and a second end (222a, 222b) which at a 5-1 position (P5a) and a 5-2 position (P5b) are rotatably connected to the inboard brake pad (100) with respect to a second rotation axis which is parallel with the first rotation axis.

The second caliper arms (230a, 230b) are parallel with each other. Each second caliper arm (230a, 230b) includes a first end (231a, 231b) which is rotatably connected to the caliper bracket (10) with respect to a third rotation axis; and a second end (232a, 232b) which at a 6-1 position (P6a) and a 6-2 position (P6b) are rotatably connected to the outboard brake pad (200) with respect to a fourth rotation axis which is parallel with the third rotation axis.

The piston (61) can be provided between the 5-1 position (P5a) and the 5-2 position (P5b) to apply a braking force to the inboard brake pad (100).

The caliper finger (62) can be provided between the 6-1 position (P6a) and the 6-2 position (P6b) to apply a braking force to the outboard brake pad (200).

The inboard brake pad (100) is pressed toward the wheel rim (3) in "B" direction by the piston (61). The outboard brake pad (200) is also pressed toward the wheel rim (3) by the reaction force of the caliper finger (65), which is generated by the piston (61), thereby providing a braking force.

The first caliper arms (220a, 220b) rotate in the clockwise direction in FIG. 6 and the second caliper arms (230a, 230b) rotate in the counterclockwise direction in FIG. 6 when the inboard brake pad (100) and the outboard brake pad (200) are pressed toward the wheel rim (3), thereby providing self-energizing effects to increase the braking force.

Figure 8:
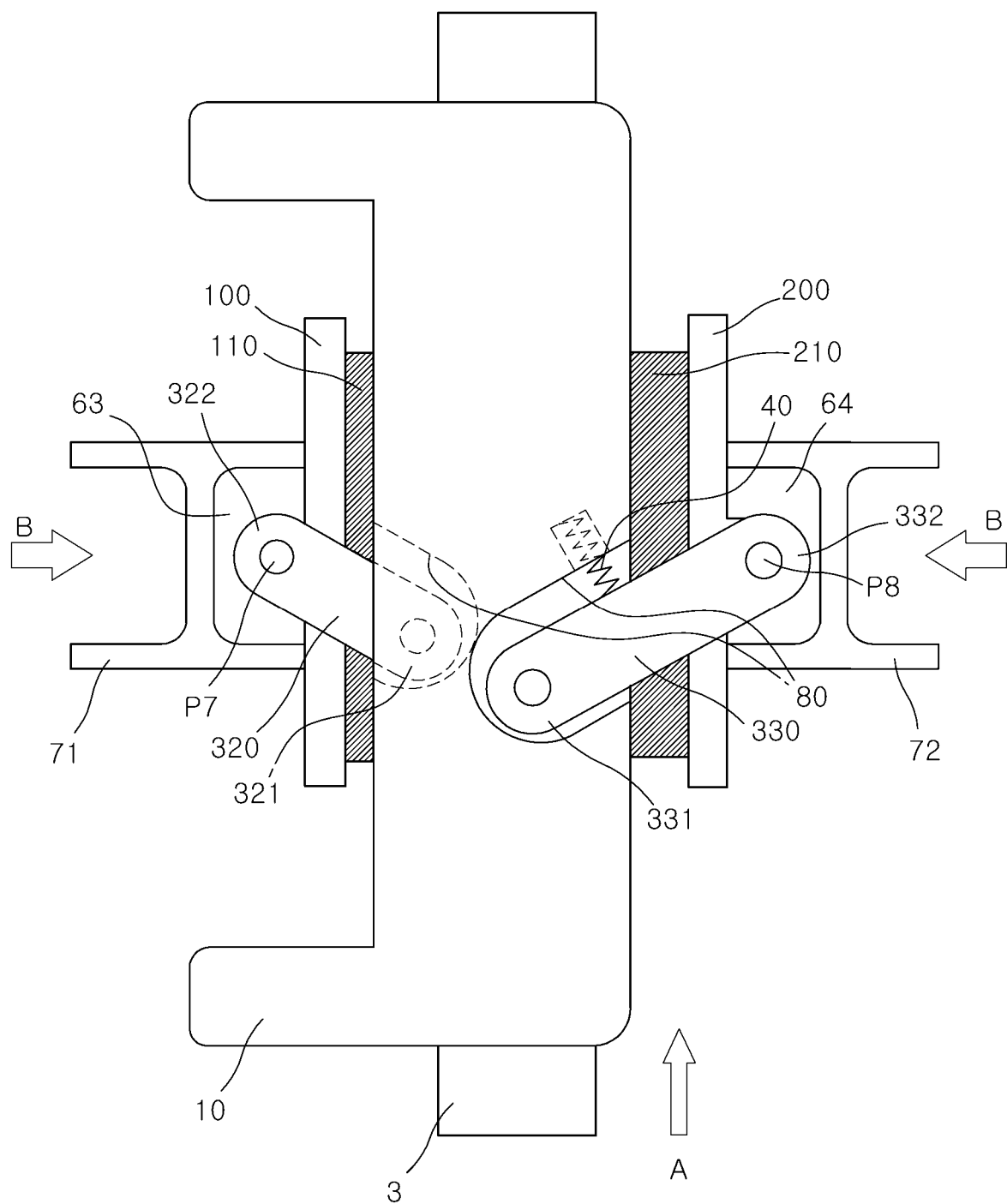
FIG. 8 is a conceptual drawing for showing the kinematic relationship and behavior of the self-energizing brake caliper which is used in a braking device of fixed caliper type.

In FIG. 8, a self-energizing brake caliper of the present disclosure which can be applied to a braking device of fixed caliper type is illustrated.

The braking device of fixed caliper type comprises the pistons (71, 72) which apply to the inboard brake pad (100) and the outboard brake pad (200), respectively. The components of the braking device which have insignificant relationship with the present disclosure will not be described in detail.

The first caliper arm (320) includes a first end (321) which is rotatably connected to the caliper bracket with respect to the first rotation axis extending in the radial direction of a wheel; and a second end (322) which at a seventh position (P7) is rotatably connected to the inboard brake pad (100) to which the piston (71) applies a braking force. The second end (322) is rotatable with respect to the second rotation axis which is parallel with the first rotation axis.

A space (63) which allows the first caliper arm (320) to rotate at the seventh position (P7) can be provided in the piston (71).

The second caliper arm (330) include a first end (331) which is rotatably connected to the caliper bracket (10) with respect to a third rotation axis extending in the radial direction of a wheel; and a second end (332) which at eighth position (P8) is rotatably connected to the outboard brake pad (200) to which the piston (72) applies a braking force. The second end (332) can rotate with respect to a fourth rotation axis which is parallel with the third rotation axis.

A space (64) which allows the second caliper arm (330) to rotate at the eighth position (P8) can be provided in the piston (72).

The inboard brake pad (100) and the outboard brake pad (200) are pressed toward the wheel rim (3) by the pistons (71, 72), thereby carrying out braking operation. The first caliper arm (320) rotates in the clockwise direction of FIG. 8 and the second caliper arm (330) rotates in the counterclockwise direction of FIG. 8, thereby providing self-energizing effects to amplify a braking force.

A plurality of the pistons (71, 72) can be provided.

Figure 9:
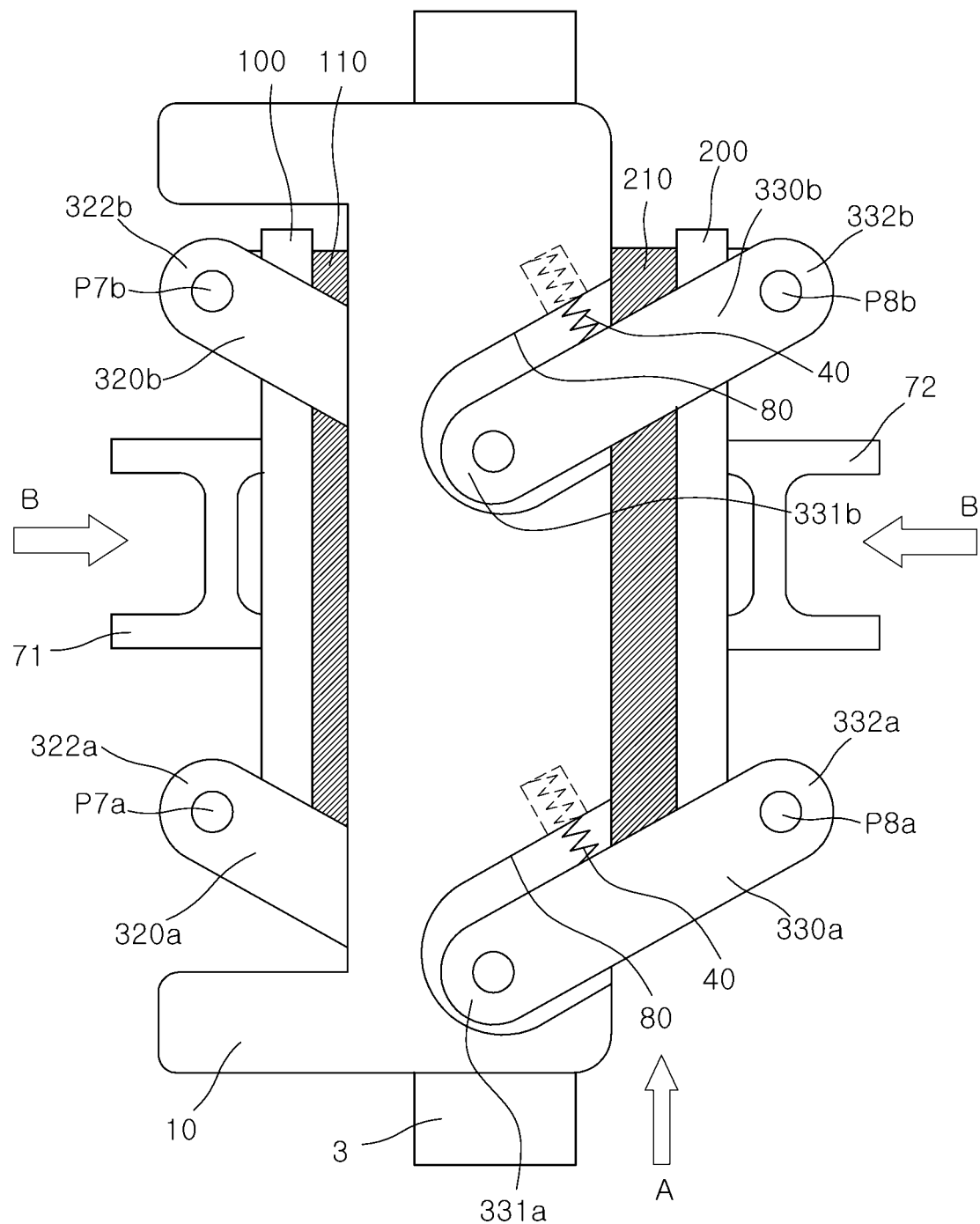
FIG. 9 is a conceptual drawing for showing the kinematic relationship and behavior of the self-energizing brake caliper which is used in a braking device of fixed caliper type according to another embodiment of the present disclosure.
Figure 10:
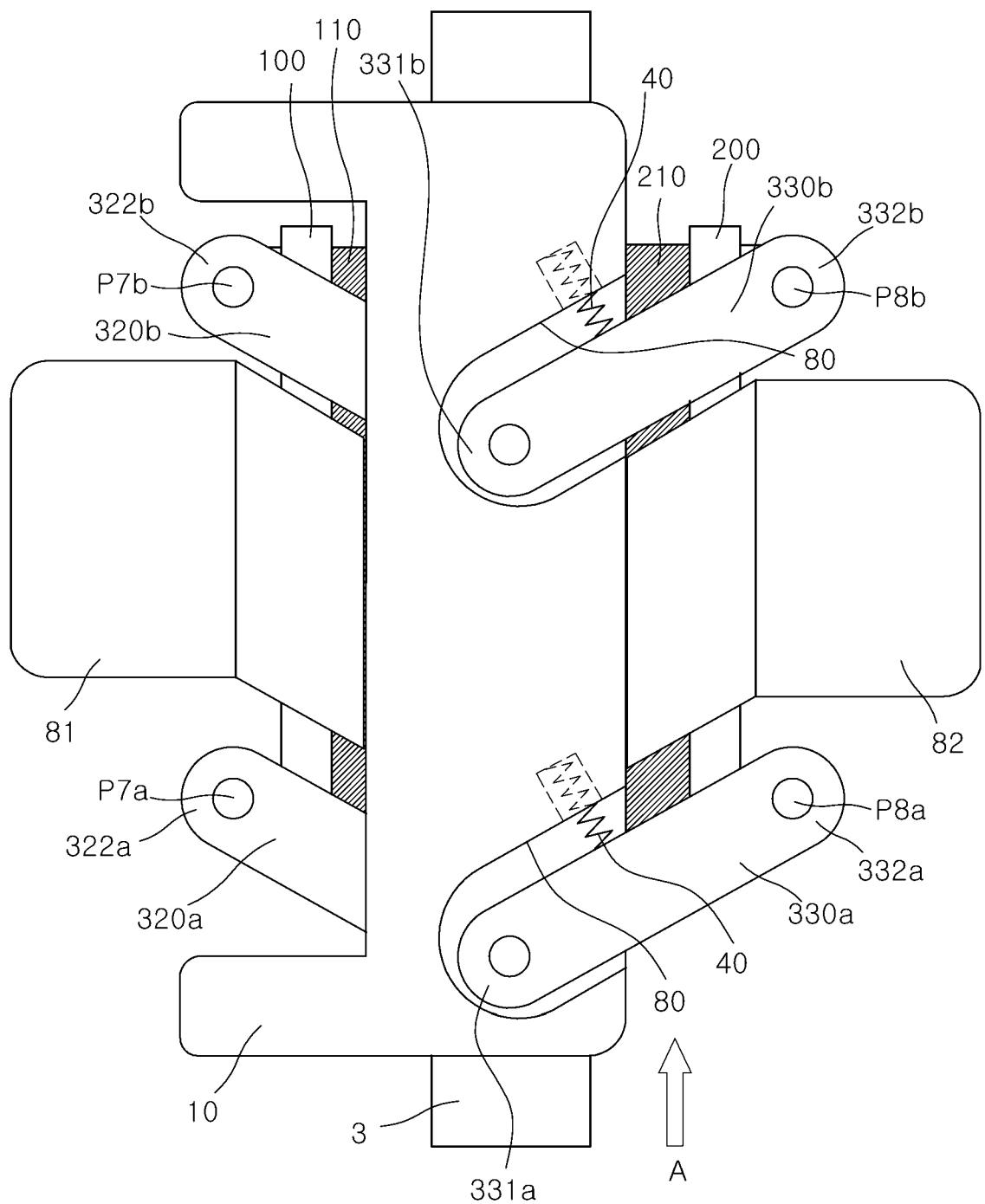
FIG. 10 is a conceptual drawing where some components are added in FIG. 9.

The embodiments of FIGS. 9 and 10 are different from those of FIG. 8 in that two first caliper arms (320a, 320b) and two second caliper arms (330a, 330b) are provided.

The first caliper arms (320a, 320b) can be provided to be parallel with each other. The first caliper arms (320a, 320b) comprise first ends (not illustrated) which are rotatably connected to the caliper bracket (10) with respect to the first rotation axis, respectively. The first caliper arms (320a, 320b) comprise second ends (322a, 322b) which at the 7-1 position (P7a) and the 7-2 position (P7b) are rotatably connected to the inboard brake pad (100) with respect to the second rotation axis which is parallel with the first rotation axis, respectively.

The second caliper arms (330a, 330b) can be provided to be parallel with each other. The second caliper arms (330a, 330b) comprise first ends (331a, 331b) which are rotatably connected to the caliper bracket (10) with respect to the third rotation axis, respectively. The second caliper arms (330a, 330b) comprise second ends (332a, 332b) which at the 8-1 position (P8a) and the 8-2 position (P8b) are rotatably connected to the outboard brake pad (200) with respect to the fourth axis which is parallel with the third rotation axis, respectively.

The piston can be provided to apply a braking force to the inboard brake pad (100) in the direction "B" between the 7-1 position (P7a) and the 7-2 position (P7b)

The piston can be provided to apply a braking force to the outboard brake pad (200) in the direction "B" between the 8-1 position (P8a) and the 8-2 position (P8b).

When the inboard brake pad (100) is pressed toward the wheel rim (3), the first caliper arms (320a, 320b) rotate in the clockwise direction in FIG. 9 and the second caliper arm (330a, 330b) rotate in the counterclockwise direction in FIG. 9 so as to press the inboard brake pad (100) and the outboard brake pad (200) toward the wheel rim (3), thereby amplifying the braking force due to the self-energizing effects.

Figure 11:
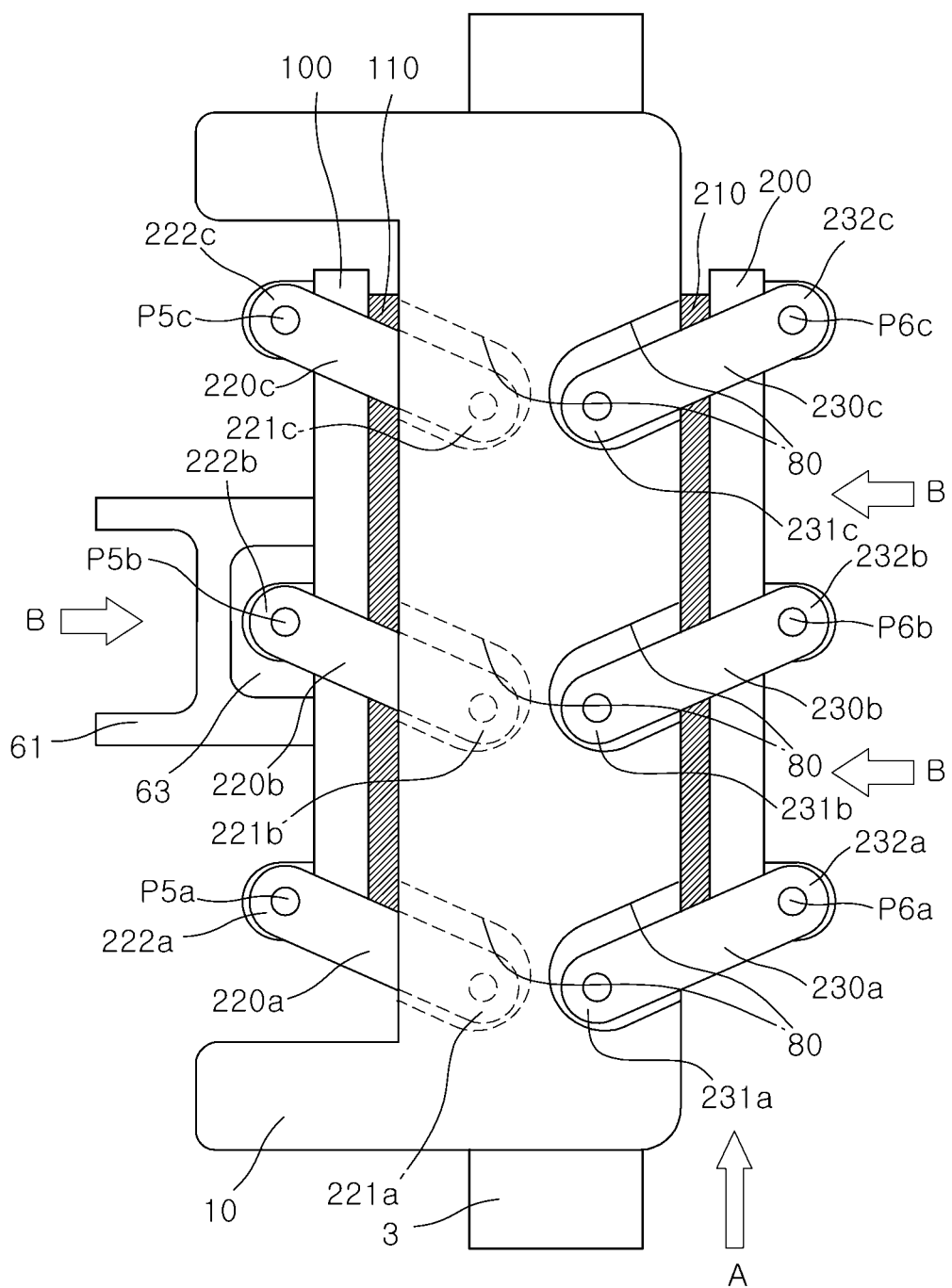
FIG. 11 is a conceptual drawing for showing the kinematic relationship and behavior of the self-energizing brake caliper which is used in a braking device of floating caliper type according to another embodiment of the present disclosure.
Figure 12:
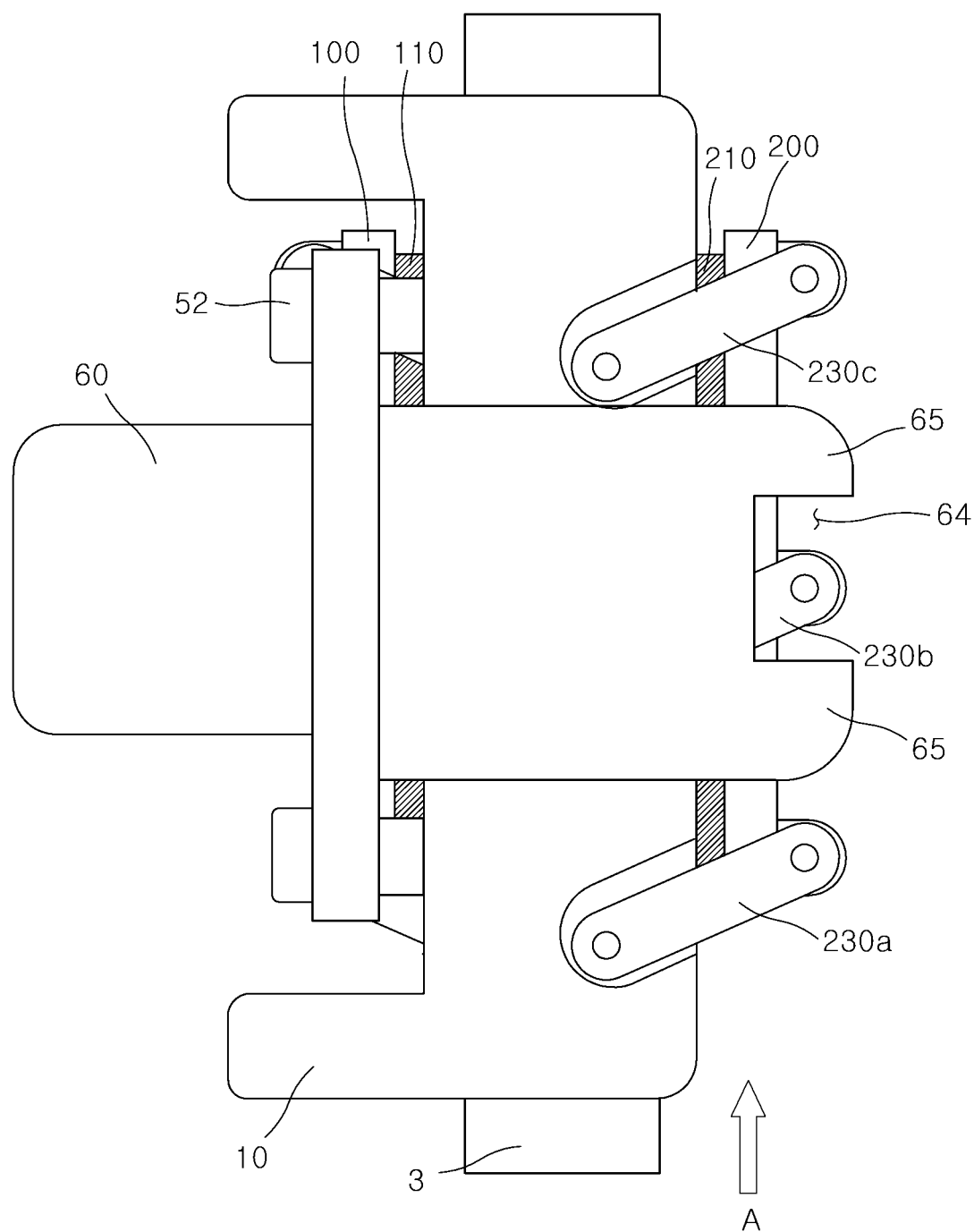
FIG. 12 is a conceptual drawing where some components are added in FIG. 11.

FIGS. 11 and 12 shows a self-energizing brake caliper of floating caliper type according to the present disclosure, which comprises three first caliper arms (220a, 220b, 220c) and three second caliper arms (230a, 230b, 230c).

The first caliper arms (220a, 220b, 220c) can be provided to be parallel with one another. The first caliper arms (220a, 220b, 220c) comprise first ends (221a, 221b, 221c) which are rotatably connected to the caliper bracket (10) with respect to a first rotation axis, respectively. The first caliper arms (220a, 220b, 220c) comprise second ends (222a, 222b, 222c) which at the 5-1 position (P5a), the 5-2 position (P5b) and the 5-3 position (P5c) are rotatably connected to the inboard brake pad (100) with respect to the second rotation axis which is parallel with the first rotation axis, respectively.

The second caliper arms (230a, 230b, 230c) are provided to be parallel with one another. The second caliper arms (230a, 230b, 230c) comprise first ends (231a, 231b, 231c) and the second ends (232a, 232b, 232c). The first ends (231a, 231b, 231c) are rotatably connected to the caliper bracket (10) with respect to the third rotation axis. The second ends (232a, 232b, 232c) are rotatably connected to the outboard brake pad (200) at the 6-1 position (P6a), the 6-2 position (P6b) and the 6-3 position (P6c), respectively, with respect to the fourth rotation axis which is parallel with the third rotation axis.

The piston (61) can be provided between the 5-1 position (P5a) and the 5-3 position (P5c) to apply a braking force to the inboard brake pad (100). A space (63) that allows the first caliper arm (220b) to rotate at 5-2 position (P2b) can be provided.

The caliper finger (65) can be provided between the 6-1 position (P6a) and the 6-3 position (P6c) to apply a braking force to the outboard brake pad (200). A space (64) which allows the second caliper arm (230b) to rotate at 6-2 position (P6c) can be provided.

When the piston (61) applies a braking force to the inboard brake pad (100) in the direction "B," the caliper finger (65) also applies a braking force generated by the reaction force to the outboard brake pad (200).

When the inboard brake pad (100) is pressed toward the wheel rim (3), the first caliper arm (220a, 220b, 220c) rotate in the clockwise direction and the second caliper arm (230a, 230b, 230c) rotate in the counterclockwise. Thus, the caliper arms apply the additional braking force to the brake pads, thereby providing the self-energizing effects.

Figure 13:
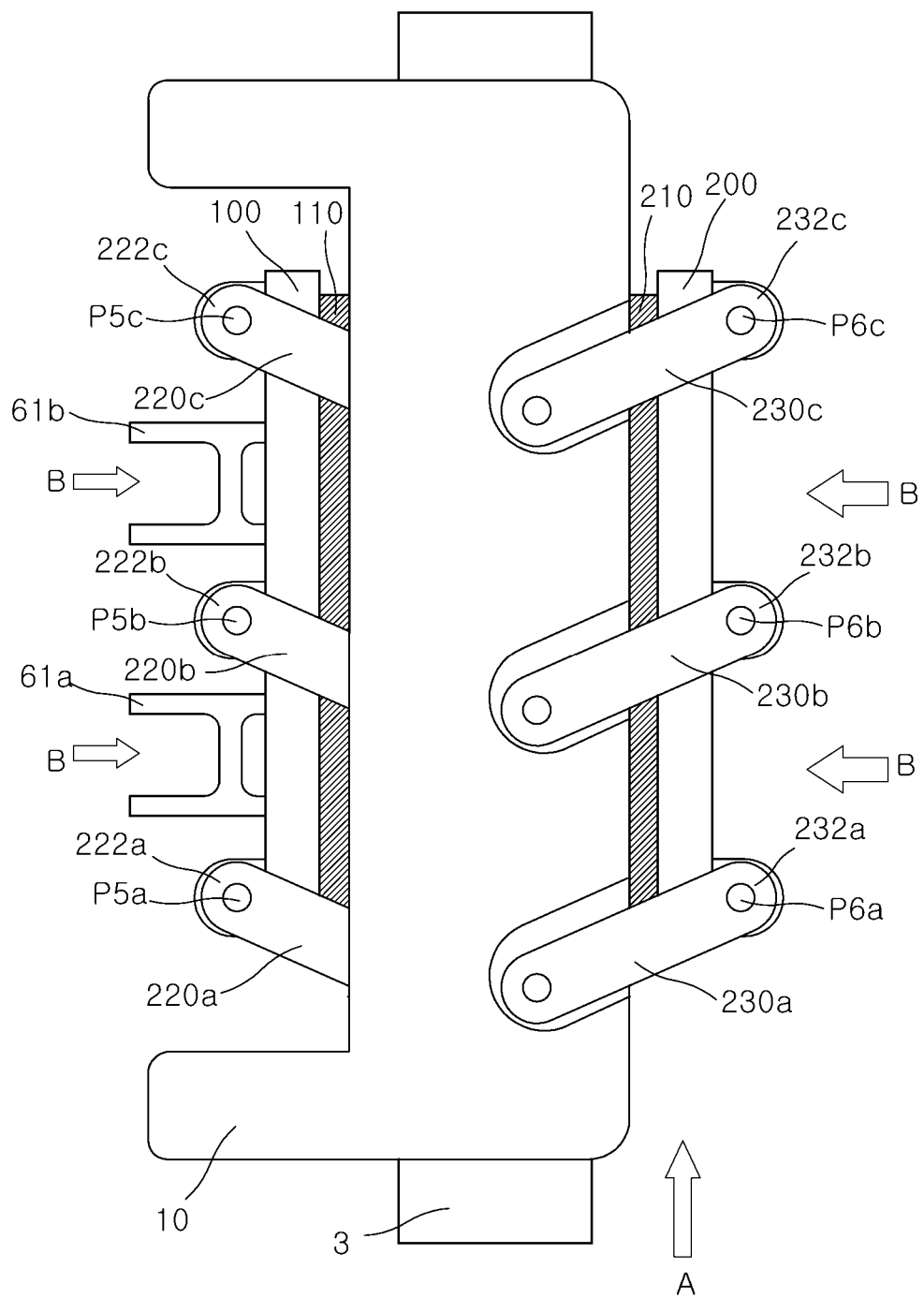
FIG. 13 is a conceptual drawing for showing the kinematic relationship and behavior of the self-energizing brake caliper which is used in a braking device of floating caliper type according to another embodiment of the present disclosure.
Figure 14:
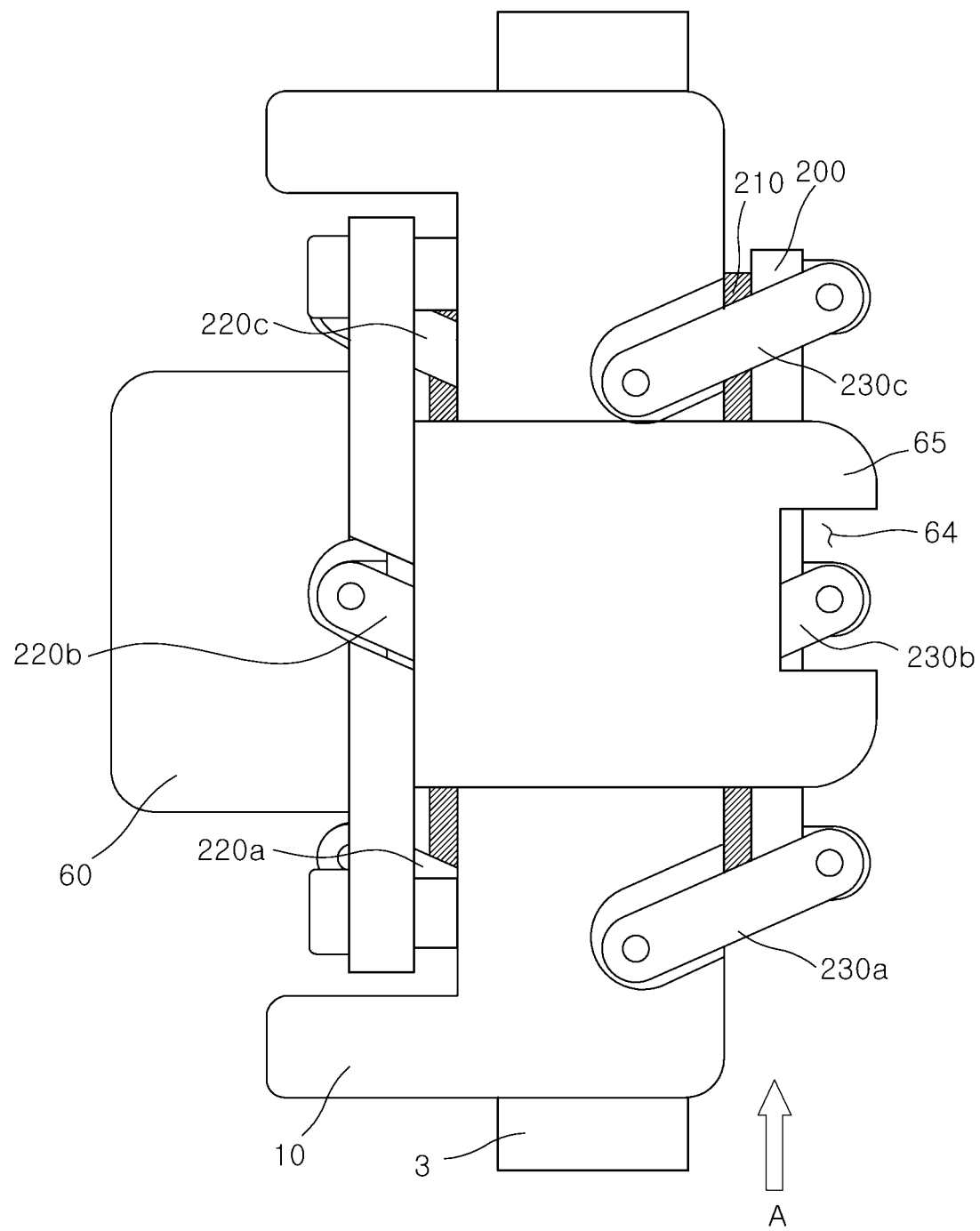
FIG. 14 is a conceptual drawing where some components are added in FIG. 13.

The embodiments of FIGS. 13 and 14 are different from the embodiments of FIGS. 11 and 12 in that the two pistons (61a, 61b) are provided.

The first piston (61a) applies a braking force to the inboard brake pad (100) between the 5-1 position (P5a) and the 5-2 position (P5b) and the second piston (61b) applies a braking force to the inboard brake pad (100) between the 5-2 position (P5b) and the 5-3 position (P5c).

Figure 15:
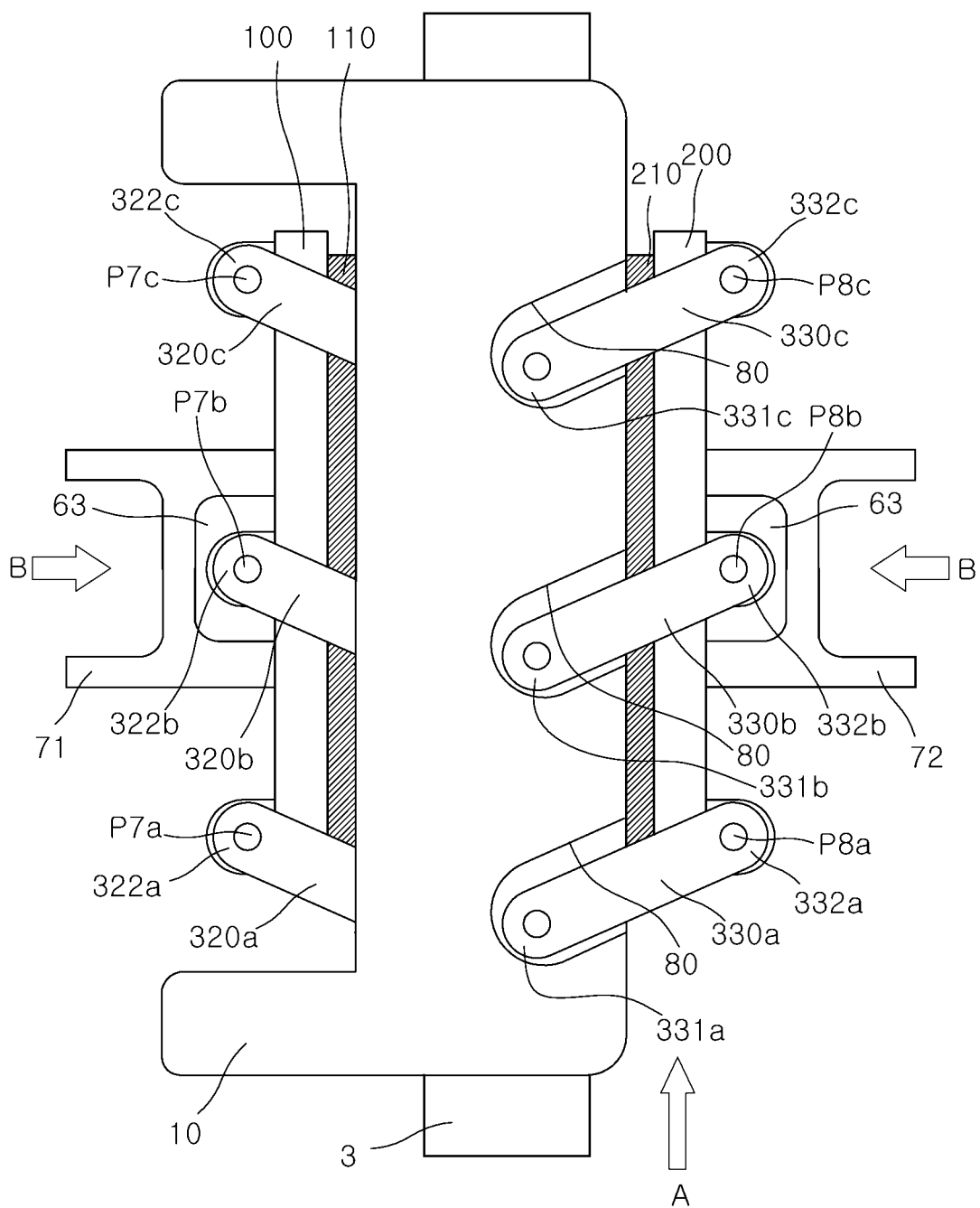
FIG. 15 is a conceptual drawing for showing the kinematic relationship and behavior of the self-energizing brake caliper which is used in a braking device of fixed caliper type according to another embodiment of the present disclosure.
Figure 16:
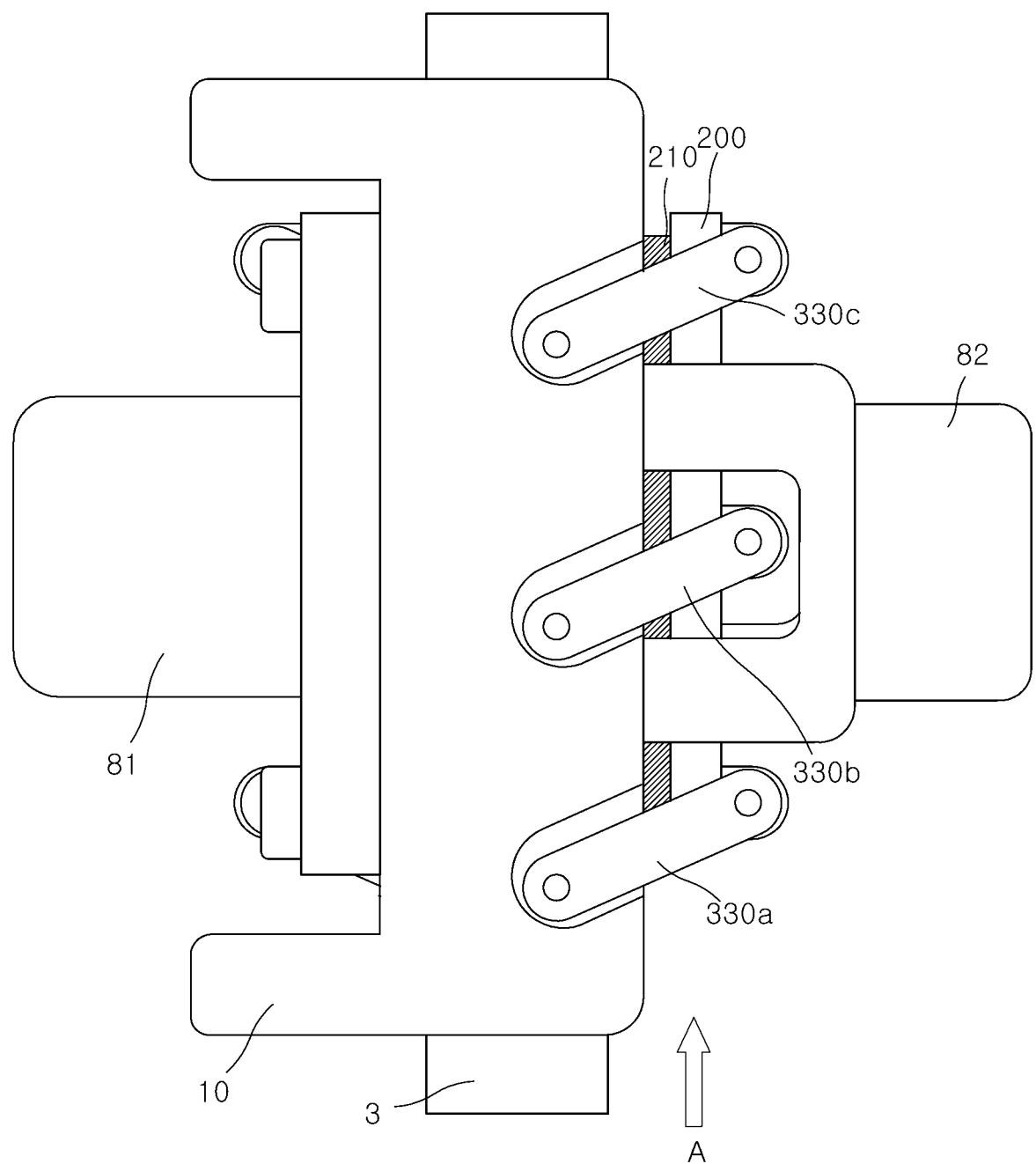
FIG. 16 is a conceptual drawing where some components are added in FIG. 15.

The embodiments of FIGS. 15 and 16 are different from the embodiments of FIGS. 8 to 10 in that three first caliper arms and three second caliper arms are provided.

The first caliper arms (320a, 320b, 320c) can be provided to be parallel with one another. The first caliper arms (320a, 320b, 320c) comprise the first ends (not illustrated) which are rotatably connected to the caliper bracket (10) with respect to the first rotation axis, respectively. The first caliper arms (320a, 320b, 320c) comprise the second ends (322a, 322b, 322c) which are rotatably connected to the inboard brake pad (100) at the 7-1 position (P7a), the 7-2 position (P7b) and the 7-3 position (P7c), respectively, with respect to the second rotation axis which is parallel with the first rotation axis.

The second caliper arms (330a, 330b, 330c) are provided to be parallel with one another. The second caliper arms (330a, 330b, 330c) comprise the first ends (331a, 331b, 331c) and second ends (332a, 332b, 332c). The first ends (331a, 331b, 331c) are rotatably connected to the caliper bracket (10) with respect to the third rotation axis. The second ends (332a, 332b, 332c) are rotatably connected to the outboard brake pad (200) at the 8-1 position (P8a), the 8-2 position (P8b) and the 8-3 position (P8c), respectively, with respect to the fourth rotation axis which is parallel with the third rotation axis.

The piston (71) is provided between the 7-1 position (P7a) and the 7-3 position (P7c) and the piston (72) is provided between the 8-1 position (P8a) and the 8-3 position (P8c).

A space (63) which allows the first caliper arm (320b) to rotate at the 7-2 position (P7b) can be provided in the piston (71). A space (63) which allows the second caliper arm (330b) to rotate at the 8-2 position (P8b) can be provided in the piston (72).

The piston (71) applies a braking force to the inboard brake pad (100) in the direction "B," and the piston (72) applies a braking force to the outboard brake pad (200) in the direction "B."

When the inboard brake pad (100) is pressed toward the wheel rim (3), the first caliper arm (320a, 320b, 320c) rotate in the clockwise direction and the second caliper arm (330a, 330b, 330c) rotate in the counterclockwise. Thus, the caliper arms apply the additional braking force to the brake pads, thereby providing the self-energizing effects.

More than three first caliper arms and more than three second caliper arms can be provided. The number of the first caliper arms can be different from the number of the second caliper arms. Further, various numbers of the inboard pistons and the outboard pistons can be combined, and the combinations can be mounted as floating caliper type or fixed caliper type.

The self-energizing brake caliper of the present disclosure can be provided in other known braking devices where the actuating force of the braking device is directly applied to the brake pads without passing through the caliper arms.

Although the present disclosure has been described with reference to accompanying drawings, the scope of the present disclosure is determined by the claims described below and should not be interpreted as being restricted by the embodiments and/or drawings described above. It should be clearly understood that improvements, changes, and modifications of the present disclosure disclosed in the claims and apparent to those skilled in the art also fall within the scope of the present disclosure. Accordingly, this description is to be taken only by way of example and not to otherwise limit the scope of the embodiments herein.

What is claimed is:

1. A self-energizing brake caliper of a braking device having a first braking part applying a braking force to an inboard brake pad and a second braking part applying a braking force to an outboard brake pad, the brake caliper comprising:
    a caliper bracket fixed to a body of a braked device;
    a first caliper arm; and
    a second caliper arm,
    wherein the first caliper arm comprises a first end which is rotatably connected to the caliper bracket with respect to a first rotation axis extending in the radial direction of a wheel and a second end which is rotatably connected to the inboard brake pad at a first position with respect to a second rotation axis which is parallel with the first rotation axis,
    wherein the second caliper arm comprises a first end which is rotatably connected to the caliper bracket with respect to a third rotation axis extending in the radial direction of the wheel and a second end which is rotatably connected to the outboard brake pad at a second position with respect to a fourth rotation axis which is parallel with the third rotation axis, and
    wherein at least one of the first caliper arm or the second caliper arm is connected to the caliper bracket by a return spring.

2. The self-energizing brake caliper according to claim 1, wherein the first caliper arm is separate from the first braking part and the second caliper arm is separate from the second braking part.

3. The self-energizing brake caliper according to claim 2, wherein one of the first braking part and the second braking part comprises a piston which applies a braking force to one of the inboard brake pad and the outboard brake pad, and the other of the braking parts comprises a caliper finger which slides along a sliding pin according to the piston operation to apply a braking force to the other brake pad, and
    wherein the piston provides a space which allows the first caliper arm to rotate.

4. The self-energizing brake caliper according to claim 3, wherein the piston is provided in plurality.

5. The self-energizing brake caliper according to claim 2, wherein one of the first braking part and the second braking part comprises a first piston which applies a braking force to the inboard brake pad, and the other of the braking parts comprises a second piston which applies a braking force to the outboard brake pad, and
    wherein the first piston provides a space which allows the first caliper arm to rotate; and the second piston provides a space which allows the second caliper arm to rotate.

6. The self-energizing brake caliper according to claim 5, wherein at least one of the first piston or the second piston is provided in plurality.

7. The self-energizing brake caliper according to claim 2, wherein the first braking part and the second braking part apply the braking force to the brake pads by a cable connected thereto.

8. The self-energizing brake caliper according to claim 1, wherein at least one of the first caliper arm or the second caliper arm is provided in plurality.

9. The self-energizing brake caliper according to claim 8, wherein a plurality of the first caliper arms are in parallel with one another and a plurality of the second caliper arms are in parallel with one another.

10. The self-energizing brake caliper according to claim 1, wherein one of the first braking part and the second braking part comprises a piston which applies a braking force to one of the inboard brake pad and the outboard brake pad, and the other of the braking parts comprises a caliper finger which slides along a sliding pin according to the piston operation to apply a braking force to the other brake pad, and
    wherein the piston provides a space which allows the first caliper arm to rotate.

11. The self-energizing brake caliper according to claim 10, wherein the piston is provided in plurality.

12. The self-energizing brake caliper according to claim 1, wherein one of the first braking part and the second braking part comprises a first piston which applies a braking force to the inboard brake pad, and the other of the braking parts comprises a second piston which applies a braking force to the outboard brake pad, and
    wherein the first piston provides a space which allows the first caliper arm to rotate; and the second piston provides a space which allows the second caliper arm to rotate.

13. The self-energizing brake caliper according to claim 12, wherein at least one of the first piston or the second piston is provided in plurality.

14. The self-energizing brake caliper according to claim 1, wherein at least a portion of the first caliper arm, at least a portion of the second caliper arm, or at least portions of both the first caliper arm and the second caliper arm are disposed in a space provided in the caliper bracket.

15. The self-energizing brake caliper according to claim 1, wherein the first braking part and the second braking part apply the braking force to the brake pads by a cable connected thereto.

* * * * *